(12) United States Patent
Wang et al.

(10) Patent No.: US 12,446,072 B2
(45) Date of Patent: Oct. 14, 2025

(54) MULTI-RU MULTI-AP TRANSMISSIONS IN WLAN SYSTEMS

(71) Applicant: INTERDIGITAL PATENT HOLDINGS, INC., Wilmington, DE (US)

(72) Inventors: Xiaofei Wang, North Caldwell, NJ (US); Hanqing Lou, Syosset, NY (US); Li Hsiang Sun, San Diego, CA (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 330 days.

(21) Appl. No.: 17/911,722

(22) PCT Filed: Mar. 16, 2021

(86) PCT No.: PCT/US2021/022515
§ 371 (c)(1),
(2) Date: Sep. 15, 2022

(87) PCT Pub. No.: WO2021/188507
PCT Pub. Date: Sep. 23, 2021

(65) Prior Publication Data
US 2023/0362994 A1 Nov. 9, 2023

Related U.S. Application Data

(60) Provisional application No. 62/990,261, filed on Mar. 16, 2020.

(51) Int. Cl.
*H04W 74/0816* (2024.01)
*H04W 84/12* (2009.01)
(52) U.S. Cl.
CPC ........ *H04W 74/0816* (2013.01); *H04W 84/12* (2013.01)

(58) Field of Classification Search
None
See application file for complete search history.

(56) References Cited

U.S. PATENT DOCUMENTS

2015/0288427 A1* 10/2015 Wang ............... H04W 72/542
  370/329
2016/0197655 A1 7/2016 Kwon et al.
(Continued)

FOREIGN PATENT DOCUMENTS

EP 3 481 129 5/2019
EP 3 691 384 8/2020
(Continued)

OTHER PUBLICATIONS

Azizi et al., "A PAR Proposal for Wake-up Radio," IEEE 802.11-16/1045r09 (Jul. 2016).
(Continued)

*Primary Examiner* — Hong S Cho
(74) *Attorney, Agent, or Firm* — VOLPE KOENIG

(57) ABSTRACT

Methods and apparatuses for operating in multi-access point (AP) wireless networks are described herein. A method performed by an AP may include transmitting, using a set of resources, a multi-AP ready-to-send (RTS) frame to at least one other AP and a plurality of stations (STAs). The method may include transmitting another frame using a portion of the set of resources. The method may include receiving, using the portion of the set of resources, a clear-to-send (CTS) frame from at least one STA of the plurality of STAs in response to the another frame. The method may include transmitting, using the portion of the set of resources, a data frame to the at least one STA. The multi-AP RTS frame may include resource allocation information for the at least one other AP and the plurality of STAs.

17 Claims, 12 Drawing Sheets

(56) References Cited

U.S. PATENT DOCUMENTS

2020/0076519 A1   3/2020   Asterjadhi et al.
2021/0051722 A1*  2/2021  Huang ................ H04L 27/2692

FOREIGN PATENT DOCUMENTS

| | | |
|---|---|---|
| GB | 2549967 A | 8/2017 |
| JP | 2012513715 A | 6/2012 |
| JP | 2016501465 A | 1/2016 |

OTHER PUBLICATIONS

Cariou, "802.11 EHT Proposed PAR," IEEE 802.11-18/1231r4 (Jan. 2019).

Cariou, "802.11 EHT Proposed PAR," IEEE 802.11-18/1231r6 (Mar. 2019).

Cariou, "IEEE 802.11 EHT draft Proposed CSD," IEEE 802.11-18/1233r4 (Jan. 2019).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D3.0 (Jun. 2018).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D6.0 (Nov. 2019).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Ryu et al., "Consideration on multi-AP coordination for EHT," IEEE 802.11-18/1982r1 (Jan. 9, 2019).

Sadeghi, "802.11bd Specification Framework Document," IEEE 802.11-19/0497r4 (Mar. 2019).

Sadeghi, "802.11bd Specification Framework Document," IEEE 802.11-19/0497r6 (Mar. 2019).

Shilo et al., "Revisiting HARQ Complexity," IEEE 802.11-19/1923-01-0be (Jan. 2020).

Sun et al., "802.11 NGV Proposed PAR," IEEE 802.11-18/0861r9 (Nov. 2018).

Sun et al., "IEEE 802.11 NGV Proposed CSD," IEEE 802.11-0862r3 (Sep. 2018).

Vermani et al., "Preamble Design Harmonization," IEEE 802.11-19/1021r1 (Jun. 27, 2019).

\* cited by examiner

MULTI-RU MULTI-AP TRANSMISSIONS IN WLAN SYSTEMS

CROSS-REFERENCE TO RELATED APPLICATIONS

This application is the U.S. National Stage, under 35 U.S.C. § 371, of International Application No. PCT/US2021/022515 filed Mar. 16, 2021, which claims the benefit of U.S. Provisional Application No. 62/990,261, filed Mar. 16, 2020, the contents of which are incorporated herein by reference.

BACKGROUND

A Wireless Local Area Network (WLAN) in an Infrastructure Basic Service Set (BSS) mode may include an Access Point (AP) for the BSS and one or more stations (STAs) associated with the AP. The AP may have access to or interface with a Distribution System (DS) or another type of wired/wireless network that carries traffic in and out of the BSS. Traffic associated with STAs that originates from outside the BSS may arrive through the AP and be delivered to the STAs. Traffic originating from STAs to destinations outside the BSS may be sent to the AP to be delivered to their respective destinations. Traffic between STAs within the BSS may also be sent through the AP; for example the source STA may send traffic to the AP and the AP may deliver the traffic to the destination STA or STAs. Multi-access point (AP) wireless networks may include multiple BSSs, multiple APs, and multiple associated STAs.

SUMMARY

Methods and apparatuses for operating in multi-access point (AP) wireless networks are described herein. A method performed by an AP may include transmitting, using a set of resources, a multi-AP ready-to-send (RTS) frame to at least one other AP and a plurality of stations (STAs). The method may include transmitting another frame using a portion of the set of resources. The method may include receiving, using the portion of the set of resources, a clear-to-send (CTS) frame from at least one STA of the plurality of STAs in response to the another frame. The method may include transmitting, using the portion of the set of resources, a data frame to the at least one STA. The multi-AP RTS frame may include resource allocation information for the at least one other AP and the plurality of STAs.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
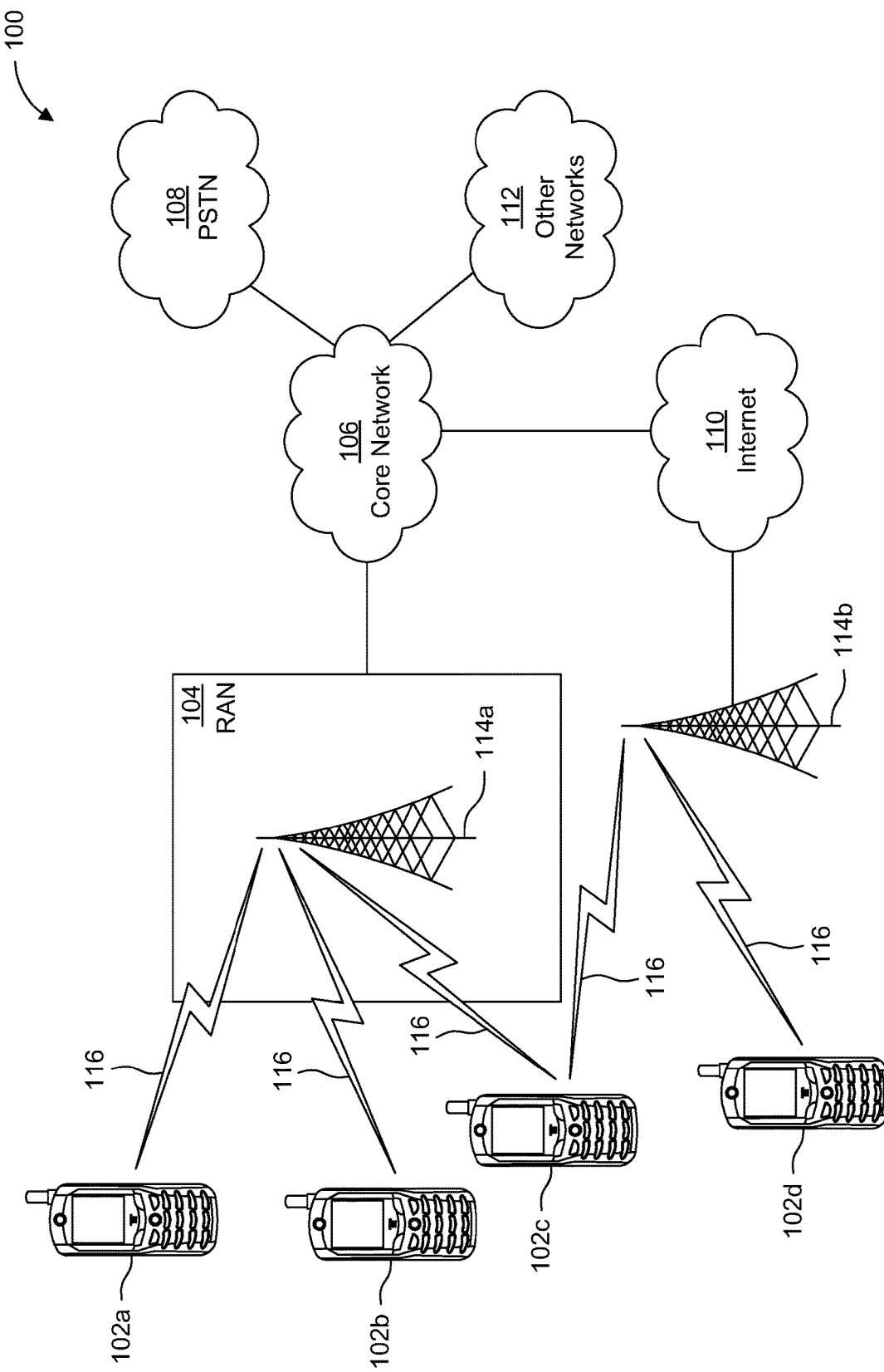
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
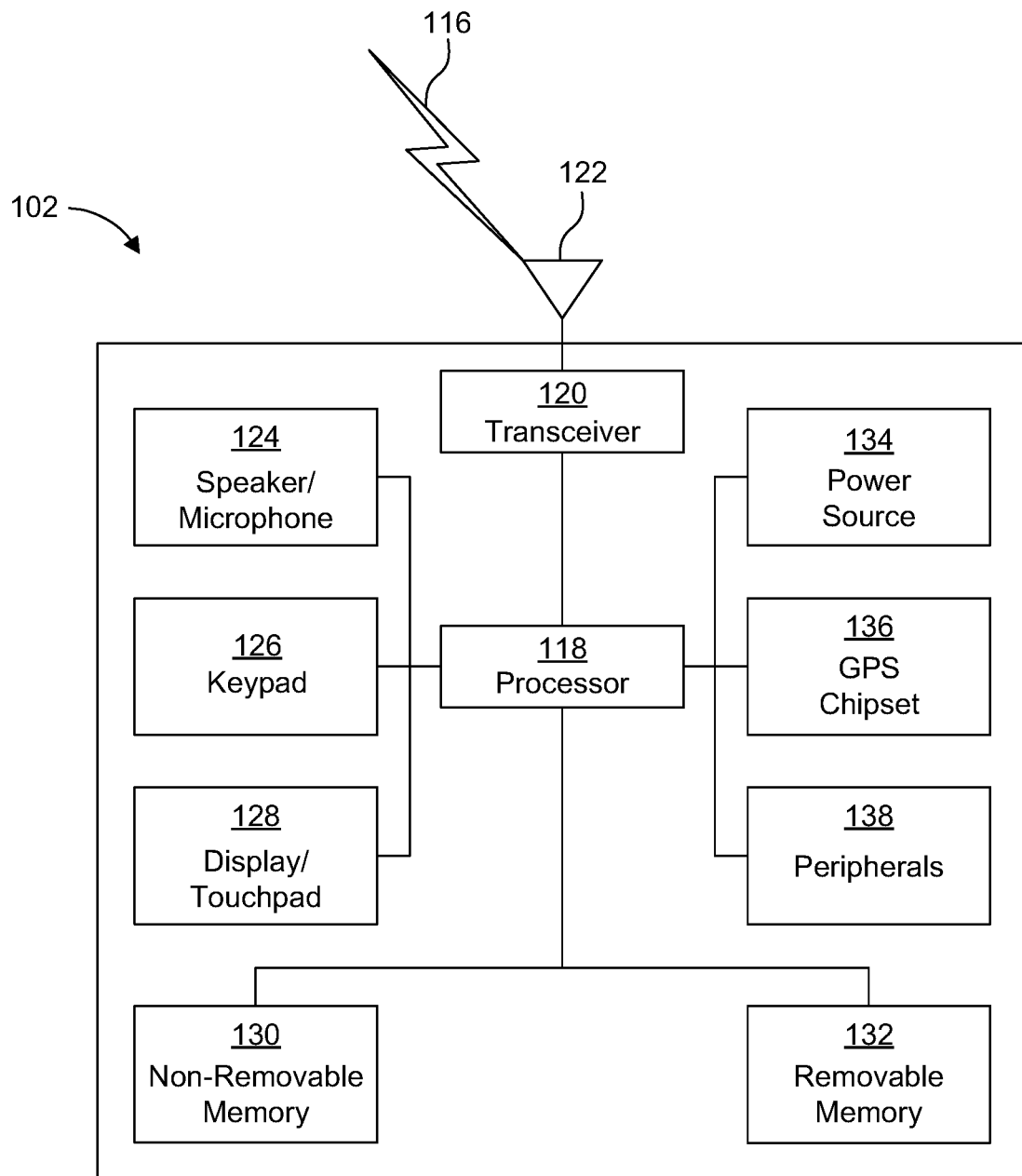
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
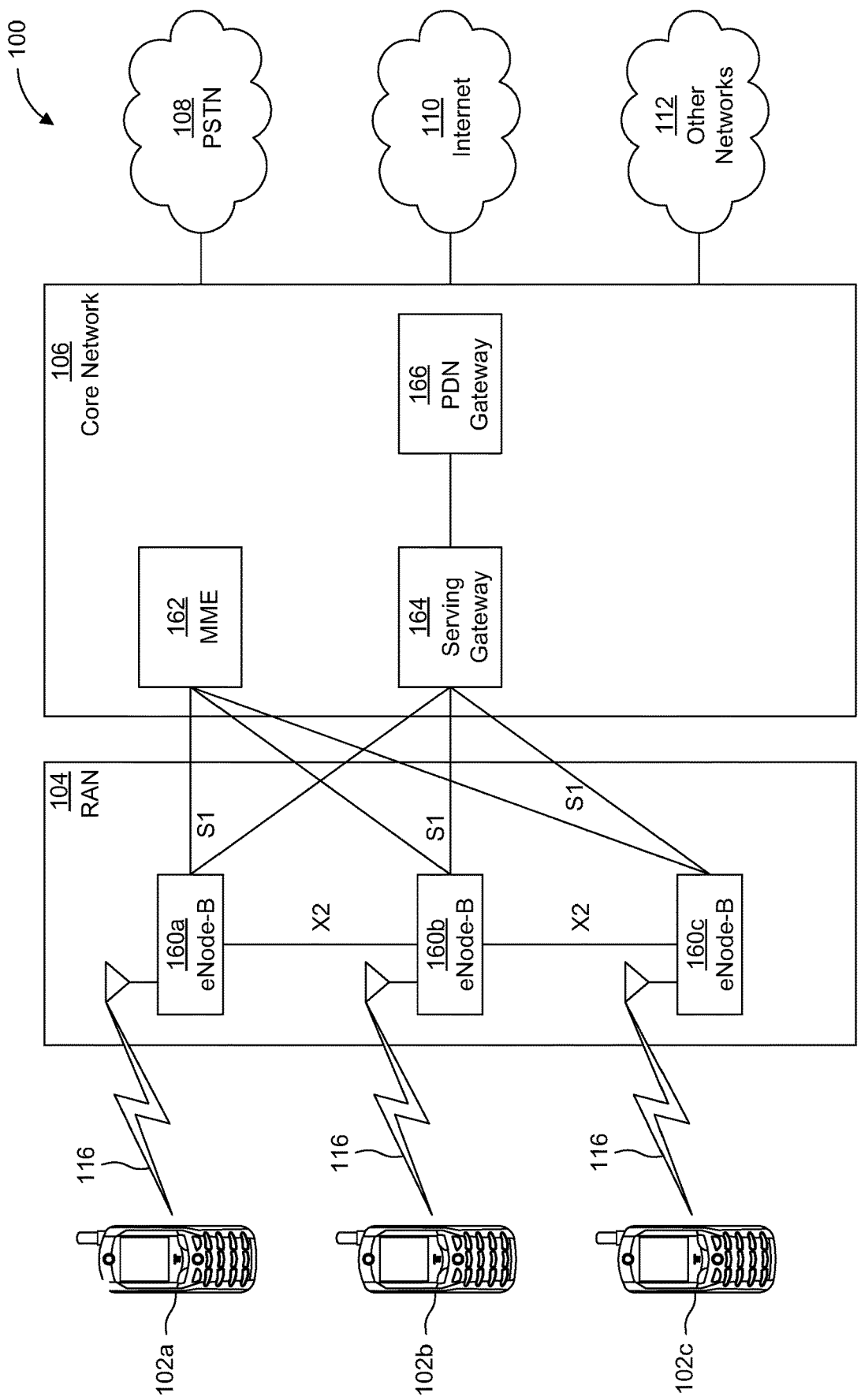
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
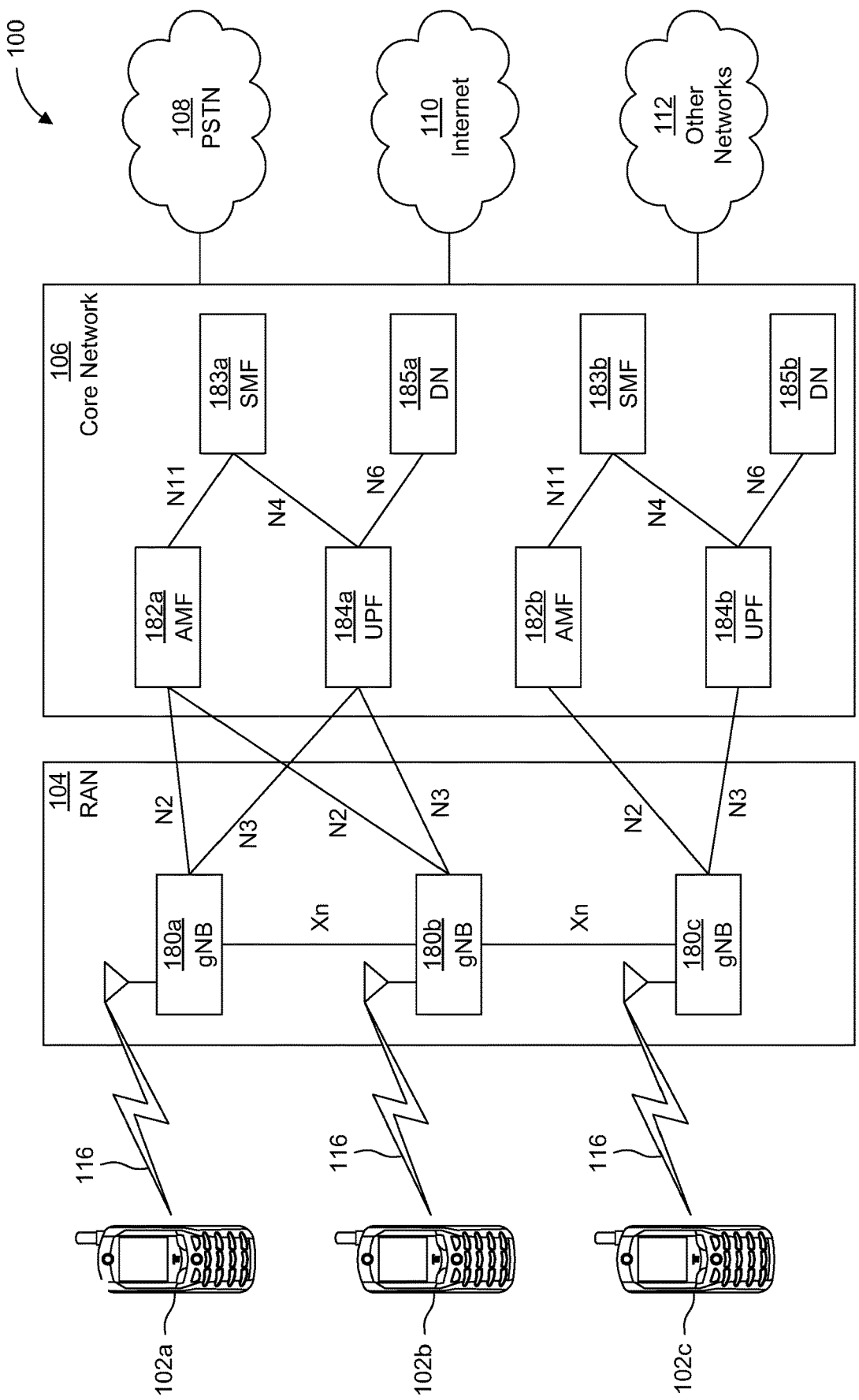
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Using the 802.11ac infrastructure mode of operation, an AP may transmit a beacon on a fixed channel, for example, the primary channel. This channel may be 20 MHz wide, and may be the operating channel of the BSS. This channel may also be used by STAs to establish a connection with the AP. The fundamental channel access mechanism in an 802.11 system is Carrier Sense Multiple Access with Collision Avoidance (CSMA/CA). In this mode of operation, every STA, including the AP, may sense the primary channel. If the channel is detected or determined to be busy, the STA backs off. Hence, only one STA may transmit at any given time in a given BSS.

In 802.11n, High Throughput (HT) STAs may also use a 40 MHz wide channel for communication. This may be achieved by combining the primary 20 MHz channel with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels may be formed by combining contiguous 20 MHz channels similar to 802.11n described above. A 160 MHz channel may be formed, for example, by combining 8 contiguous 20 MHz channels, or by combining two non-contiguous 80 MHz channels. This may also be referred to as an 80+80 configuration. For the 80+80 configuration, the data, after channel encoding, may be passed through a segment parser that divides it into two streams. IFFT and time domain processing may be performed on each stream separately. The streams may then be mapped on to the two channels, and the data may be transmitted. At the receiver, this mechanism may be reversed, and the combined data may be sent to the MAC.

To improve spectral efficiency, 802.11ac may support downlink Multi-User MIMO (MU-MIMO) transmissions to multiple STAs in the same symbol's time frame, e.g. during a downlink OFDM symbol. The potential for the use of downlink MU-MIMO may also be supported by 802.11ah. It is important to note that since downlink MU-MIMO, as it is used in 802.11ac, may use the same symbol timing to multiple STAs, interference among the waveform transmissions to multiple STAs may not be an issue. However, all STAs involved in MU-MIMO transmission with the AP may need to use the same channel or band, and this may limit the operating bandwidth to the smallest channel bandwidth that is supported by the STAs that are included in the MU-MIMO transmission with the AP.

802.11ax defines a physical layer specification and medium access control layer specification that enables High Efficiency (HE) operation for 802.11 devices. 802.11ax is considered a next main generation of Wi-Fi after 802.11ac. 11ax may also support a new numerology with smaller subcarrier spacing. DL/UL OFDMA is introduced in 11ax to achieve better spectrum efficiency.

In IEEE 802.11ax specifications, four Physical Layer Convergence Procedure (PLCP) Protocol Data Unit (PPDU) formats may be supported: high efficiency (HE) single user (SU) PPDU, HE multi-user (MU) PPDU, HE extended range (ER) SU PPDU and HE transport block (TB) PPDU. These PPDU formats are described below.

A HE SU PPDU format may be used for single user transmission. An example of an HE SU PPDU is provided below in Table 1.

TABLE 1

| Example Format for HE SU PPDUs | | | | | | | | | |
|---|---|---|---|---|---|---|---|---|---|
| L-STF | L-LTF | L-SIG | RL-SIG | HE-SIG-A | HE-STF | HE-LTF | ... | HE-LTF | Data | PE |

An HE MU PPDU format may be used for transmissions to one or more users if the PPDU is not a response of a Trigger frame. An HE-SIG-B field may be presented in this PPDU format. An example of the HE MU PPDU format is provided below in Table 2.

TABLE 2

| Example format for HE SU PPDUs | | | | | | | | | |
|---|---|---|---|---|---|---|---|---|---|
| L-STF | L-LTF | L-SIG | RL-SIG | HE-SIG-A | HE-SIG-B | HE-STF | HE-LTF | ... HE-LTF | Data | PE |

An HE ER SU PPDU format may be used for SU transmission with extended range. In this format, the HE-SIG-A field may be twice as long as the HE-SIG-A field in other HE PPDUs. An example of an HE ER SU PPDU format is provided below in Table 3.

TABLE 3

Example format for HE ER SU PPDUs

| L-STF | L-LTF | L-SIG | RL-SIG | HE-SIG-A | HE-STF | HE-LTF | ... | HE-LTF | Data | PE |
|---|---|---|---|---|---|---|---|---|---|---|

An HE TB PPDU format may be used for a transmission that is a response to the Trigger frame or a frame carrying a trigger response scheduling (TRS) control subfield from an AP. The duration of the HE-STF field in the HE TB PPDU may be 8 us, double the size of an HE-STF field in an HE PPDU. An example of an HE TB PPDU format is provided below in Table 4.

TABLE 4

Example format for HE TB PPDUs

| L-STF | L-LTF | L-SIG | RL-SIG | HE-SIG-A | HE-STF | HE-LTF | ... | HE-LTF | Data | PE |
|---|---|---|---|---|---|---|---|---|---|---|

An L-SIG field, HE-SIG-A field, and/or an HE-SIG-B field may carry PHY layer control information for the PPDU. An L-SIG field may have a legacy numerology and format, so that all the STAs understand the L-SIG field. HE-SIG-A fields and HE-SIG-B fields may be understood by HE STAs. Examples of L-SIG fields are shown in Table 5. Examples of HE-SIG-A fields for different PPDU formats are shown in Table 6.

TABLE 5

L-SIG fields

| Field | Bits |
|---|---|
| Rate | 4 |
| Length | 12 |
| CRC | 1 |
| Tail | 6 |

TABLE 6

HE-SIG-A fields with different PPDU

| Field | Bits |
|---|---|
| HE SU PPDU and HE ER SU PPDU | |
| format | 1 |
| Beam change | 1 |
| UL/DL | 1 |
| MCS | 4 |
| DCM | 1 |
| BSS color | 6 |
| Reserved | 1 |
| Spatial Reuse | 4 |
| Bandwidth | 2 |
| GI + LTF | 2 |
| NSTS and Midamble Periodicity | 3 |
| TXOP | 7 |
| Coding | 1 |
| LDPC Extra Symbol Segment | 1 |
| STBC | 1 |
| Beam formed | 1 |

TABLE 6-continued

HE-SIG-A fields with different PPDU

| Field | Bits |
|---|---|
| Pre-FEC Padding Factor | 2 |
| PE Disambiguity | 1 |
| Reserved | 1 |
| Doppler | 1 |
| CRC | 4 |
| Tail | 6 |
| HE MU PPDU | |
| UL/DL | 1 |
| SIGB MCS | 3 |
| SIGB DCM | 1 |
| BSS Color | 6 |
| Spatial Reuse | 4 |
| Bandwidth | 3 |
| # of SIGB Symbols or MU-MIMO users' | 4 |
| SIGB Compression | 1 |
| GI + LTF size | 2 |
| Doppler | 1 |
| TXOP | 7 |
| Reserved | 1 |
| # of HE-LTF symbols and midamble periodicity | 3 |
| LDPC extra symbol segment | 1 |
| STBC | 1 |
| Pre-FEC Padding factor | 2 |
| PE disambiguity | 1 |
| CRC | 4 |
| Tail | 6 |
| HE TB PPDU | |
| Format | 1 |
| BSS Color | 6 |
| Spatial Reuse 1 | 4 |
| Spatial Reuse 2 | 4 |
| Spatial Reuse 3 | 4 |
| Spatial Reuse 4 | 4 |
| Reserved | 1 |
| Bandwidth | 2 |
| TXOP | 7 |
| Reserved | 9 |
| CRC | 4 |
| Tail | 6 |

Development of specifications for a further generation of Wi-Fi in 802.11be is currently underway. An example of a PPDU design that may be consistent with 802.11be specifications is detailed below in FIG. 2.

Figure 2:
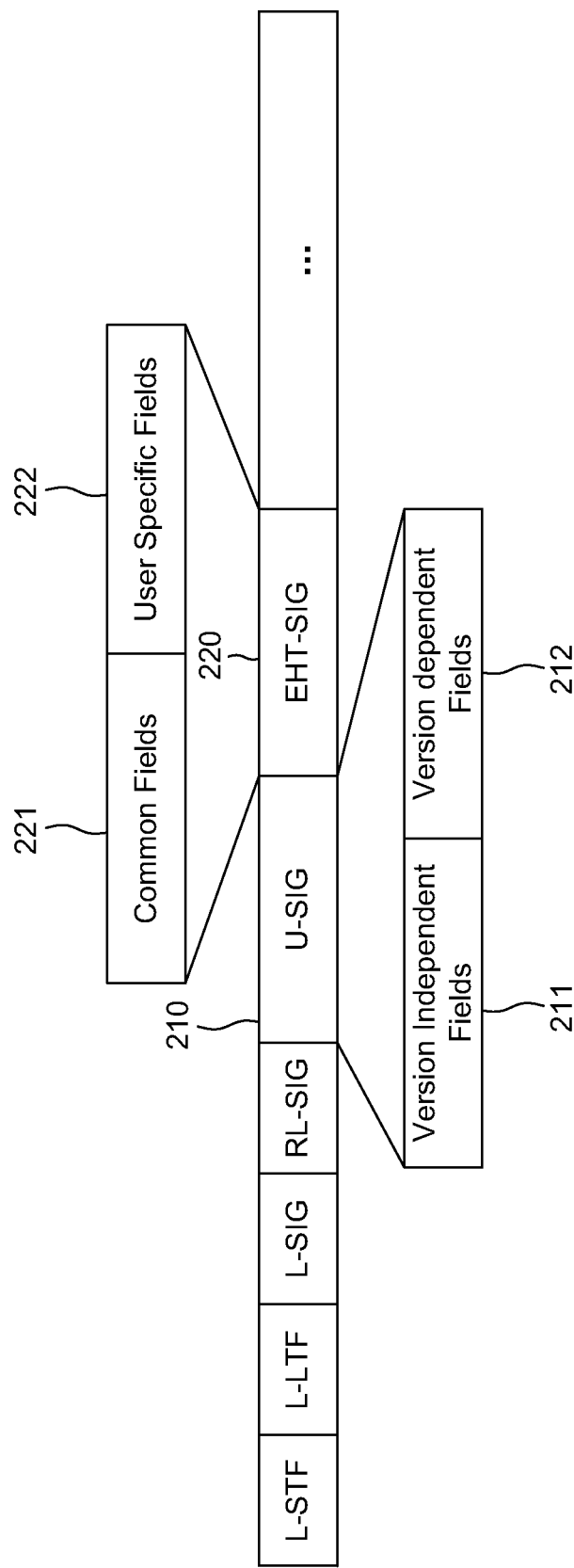
FIG. 2 is a drawing of a preamble structure of an extremely high throughput (EHT) Physical Layer Convergence Procedure (PLCP) Protocol Data Unit (PPDU)

FIG. 2 is an illustration of an example preamble structure for an extremely high throughput (EHT) Physical Layer Convergence Procedure (PLCP) Protocol Data Unit (PPDU). Forthcoming 802.11 specifications, such as 11be, may support the EHT PPDU preamble structure shown in FIG. 2. The Universal Signal fields (U-SIG) fields 210 may include version independent fields 211 and version dependent fields 212. The bits in the version independent fields 211 may have a static location and bit definition across different generations/PHY versions. The bits in the version independent fields 212 may include PHY version identifier, UL/DL flag, BSS color, TXOP duration, and bandwidth information, among other information. The version dependent bits may carry data relating to a PPDU type. Combined with common fields 221 in an EHT-SIG field 220, the version dependent fields may also carry data relating to a modulation and coding scheme (MCS), number of space time streams, GI+EHT-LTF side, coding, etc. User specific fields 222 included, for example, in the EHT-SIG field, may be used in MU configuration(s). 802.11be specifications may not support separate PPDU formats for SU and MU, but may have a single PPDU format for both SU and MU.

Due to the different levels of interference experienced at different APs, APs may not always be able to transmit on the same time/frequency resources to one or more STAs in a joint transmission. Procedures that address this problem may enable a coordinating AP to orchestrate a joint transmission taking Clear Channel Assessments (CCAs) at different APs into account such that the time/frequency resource from different APs may be different.

An EHT PPDU may enable the use of multiple Resource Units (RUs) for transmitting data to a STA, or for transmitting of data by a STA. It may be advantageous to design procedures to enable the RUs (or a portions of an RU) to be used by different STAs and/or APs to provide diversity.

Even though a PPDU transmitted from multiple APs on orthogonal resources, coordinated by a trigger frame from a coordinating AP, may be transparent to the receiving STA, the residual CFO drift and phase noise may be different at different APs. Therefore, it may be desirable to define a procedure by which the STA may perform independent phase tracking from different transmitters.

Enhancements for EHT may support multi-RU transmissions, which may allow a STA to use more than one RU to transmit. With current trigger-based uplink transmissions, an AP may assign an RU for a STA to perform a trigger-based transmission, which may also be referred to as a schedule-based transmission. In some embodiments, the AP may assign RUs for a STA to perform uplink random access, which may be referred to as a random-based transmission. Both transmission methods may allow a STA to transmit on one RU. If multiple-RU UL transmission is allowed, RU assignment and RU random access procedure(s) may need to be modified.

Multi-AP and multi-link operations may be considered as features to be supported by 802.11be devices. In Multi-AP scenarios, multiple APs from different BSSs may cooperate to conduct operations such as joint transmission or coordinated OFDMA, or they may share frequency-time resources with each other in order to improve overall network performance. Medium reservation may be essential to enable such coordinated operations across APs and BSSs. In multi-link operations, link aggregation may require medium reservations and information sharing as well. One issue addressed by embodiments described herein is how to design an efficient and effective medium reservation mechanism for multi-AP and multi-link operations.

Figure 3:
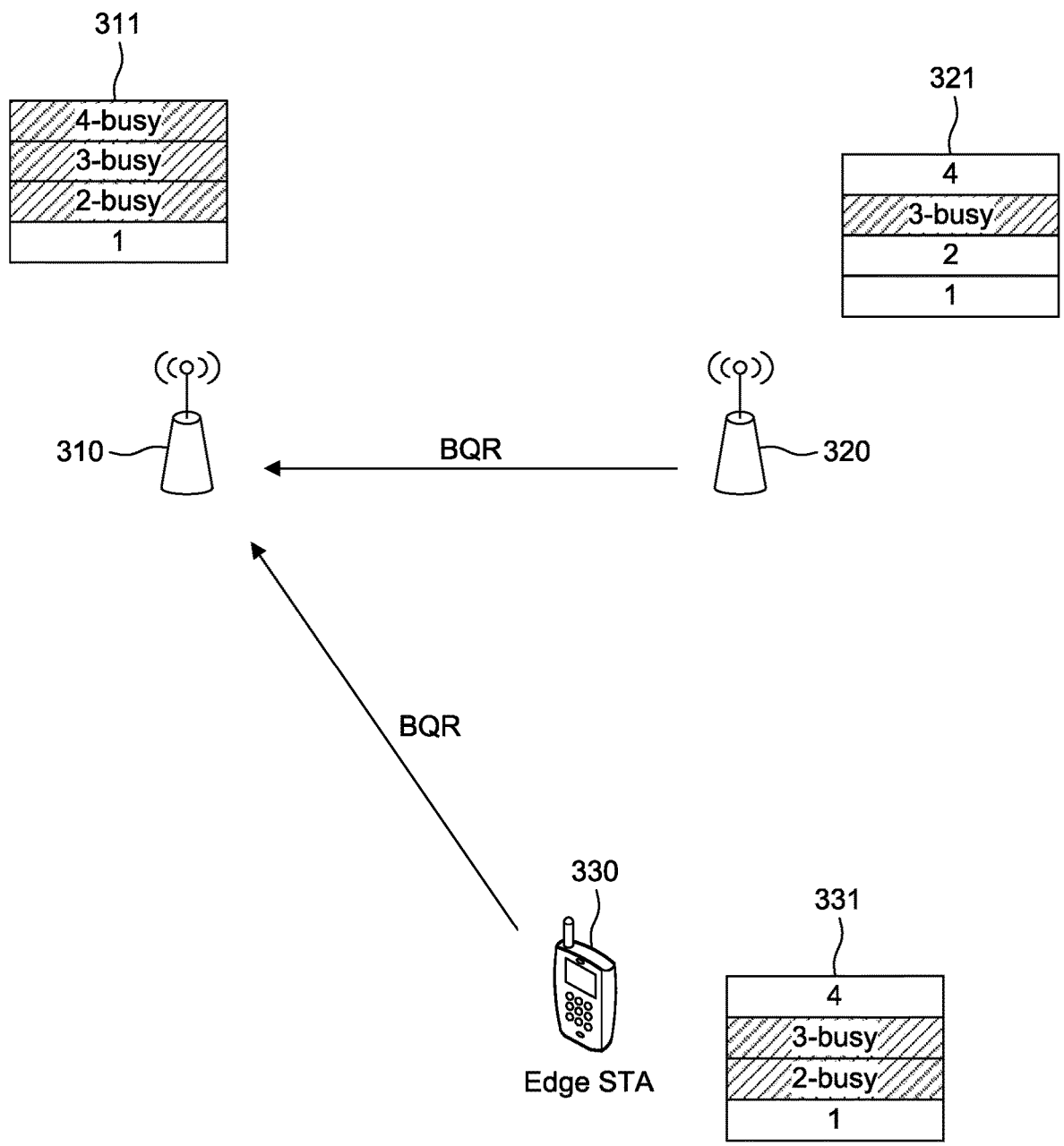
FIG. 3 is a system diagram illustrating an example procedure for coordinated access points (APs) and/or non-AP stations (STAs) to report their clear channel assessment (CCA) status per sub-band, for example, per 20 MHz sub-band.

A coordinating AP may initiate a bandwidth query report (BQR) procedure for coordinated AP(s) and/or non-AP STA(s) to report their CCA status per sub-band (e.g. 20 MHz), as illustrated in FIG. 3.

FIG. 3 is an illustration of a BQR procedure involving a coordinated AP and non-AP STAs. The procedure may allow the coordinating AP to perform RU allocation for a joint transmission in which the transmitted symbols from coordinating and coordinated AP(s) do not violate CCA constraints associated with any of the individual APs and/or non-AP STAs. For example, as shown in FIG. 3, the BQR procedure may involve a coordinating AP 310, at least one coordinated AP 320, and at least one non-AP edge STA 330. The coordinating AP 310, the coordinated AP 320, and the non-AP STA 330 may be configured to operate on a channel that includes multiple sub-channels 1-4. The coordinating AP 310 may initiate the BQR procedure, for example, by triggering the coordinated AP 320 and the non-AP STA 330 to transmit reports. The coordinating AP 310 may initiate the BQR procedure by transmitting a frame that solicits reports regarding the status of the subchannels as observed by the coordinated AP 320 and the non-AP STA 330. The coordinating AP 310 may also assess the status of sub-channels at its own location. The coordinating AP 310 may observe that sub-channel 1 is idle, the coordinated AP 320 may observe that sub-channels 1, 2, and 4 are idle, and the cell edge STA 330 may observe that sub-channels 1 and 4 are idle. The coordinating AP 310 may schedule RUs in subchannel 1 from itself and in sub-channel 4 from the coordinated AP, to the STA. Such RU assignment may not violate any party's CCA constraints, as illustrated in FIG. 4, as the non-AP STA 330 is not scheduled to perform transmissions to the coordinating AP 310 or the coordinated AP 320 in RUs that are reported as occupied.

Figure 4:
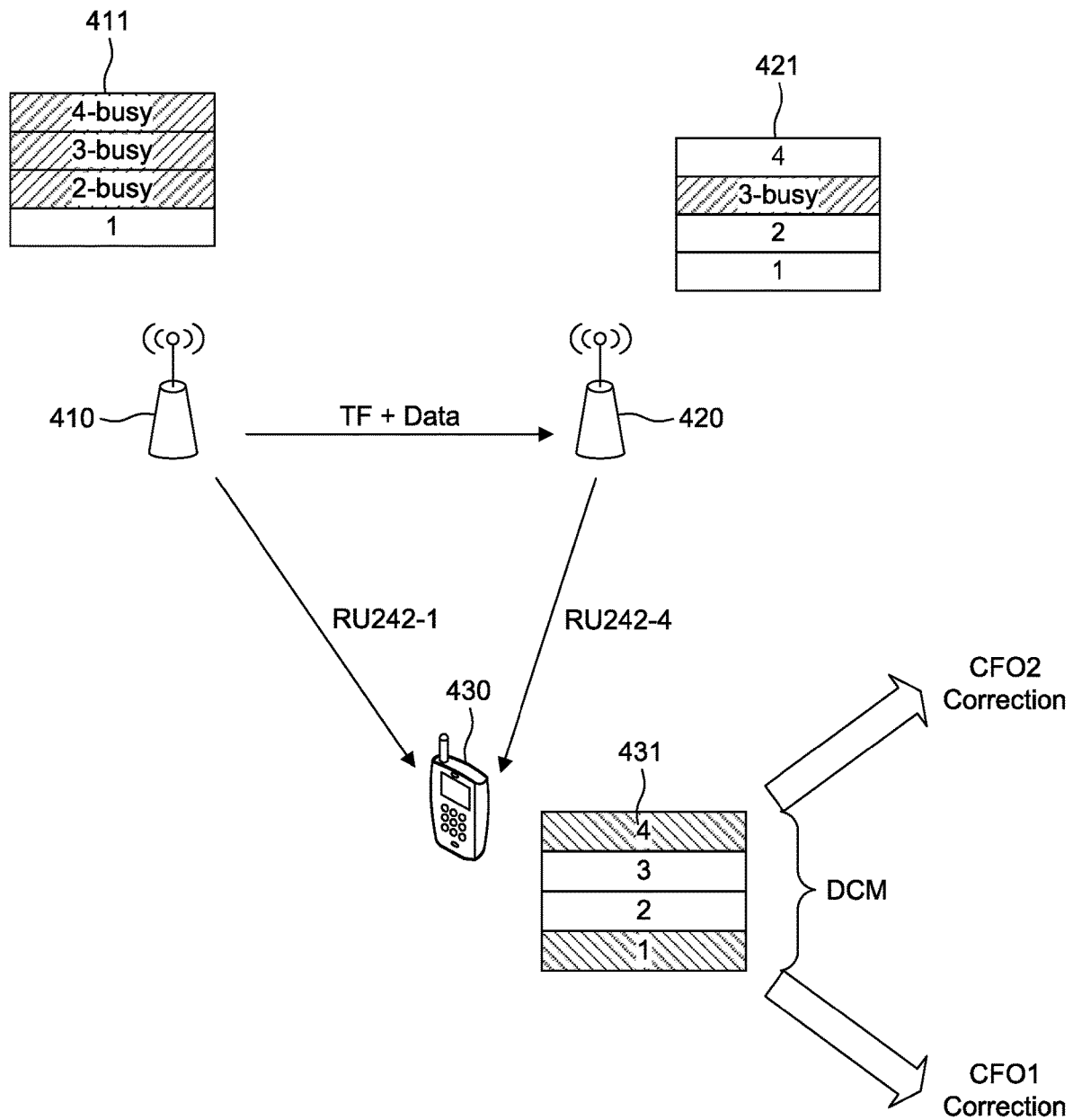
FIG. 4 is a system diagram illustrating an example procedure for joint transmission with one or more CCA constraints on orthogonal resources.

FIG. 4 is an illustration of joint transmission with a CCA constraint on orthogonal resources. In a scenario similar to that described with respect to FIG. 3, a coordinating AP 410 may be in communication with a coordinated AP 420 and a non-AP STA 430. The coordinating AP 410, the coordinated AP 420, and the non-AP STA 430 may be configured to operate on a channel that includes multiple sub-channels 1-4. Resource-specific phase tracking may be employed at a receiver side, for example, at the non-AP STA 430 and/or at the coordinated AP 420. As in FIG. 3, the coordinating AP 410 may observe that sub-channel 1 is idle, the coordinated AP 420 may observe that sub-channels 1, 2, and 4 are idle, and the cell edge STA 430 may observe that sub-channels 1 and 4 are idle. As shown in FIG. 4, the coordinating AP 410 may transmit a Trigger Frame (TF) that may be sent to initiate a joint transmission from the coordinating AP 410 and the coordinated AP 420 to the non-AP STA 430. Before or together with the TF to the coordinated AP 420, the coordinating AP 410 may signal uncoded or coded data to be transmitted by the coordinating AP 420. A diversity or beamforming scheme may be utilized by the transmission from multiple APs. The coordinating AP 410 may transmit data to the non-AP STA 430 over sub-channel 1, using RU242, while the coordinated AP 420 may transmit data to the non-AP STA 430 over sub-channel 4, using RU242. The non-AP STA 430 may receive the transmitted data from the coordinating AP 410 and the coordinated AP 420.

In some examples, if the time/frequency resources overlap in the transmission from the APs, a space-time diversity scheme can be used to increase diversity. A precoder can be used to jointly precode the transmission for beamforming.

In some examples, if the time/frequency resources do not overlap (i.e., the resources are orthogonal resources), or the same time/frequency resource is utilized by APs but the precoding is performed separately, for example, via separate/orthogonal channel estimation signals from each AP, in the joint transmission from the APs, a Dual Carrier Modulation (DCM) scheme may be used. Alternatively, or additionally, coordinated AP's transmission may compliment coordinating AP's transmission such as transmitting a different redundancy version.

As different APs, e.g., coordinating AP 410 and coordinated AP 420, may have independent phase noises and residual CFO drifts, the receiving STA, e.g., the non-AP STA 430 as is shown in FIG. 4, may perform independent phase tracking on the transmissions from different APs.

The EHT preamble may indicate to the receiver that pilots in two regions of the frequency resource are to be independently tracked. For example, the two regions may be the two RUs from different APs. The EHT preamble may indicate to the receiver that pilots are not single stream pilots (to be tracked per stream), and the pilot tones in the training fields are orthogonal and the channel estimation of pilot tones is to be performed for each spatial stream. The above indication may enable the receiving STA to perform phase correction independently for the transmissions from different APs.

In some embodiments, a general trigger frame may be modified. For example, in some methods, a trigger frame may be similar as defined in 802.11, for example, the trigger frame may include a common information field and a plurality of user info fields. Each user info field may assign one RU to one STA. However, there may be more than one user info field associated with one STA.

In some methods, a trigger frame may include a user info field, which may assign one or more RUs to a STA. Alternatively, or additionally, the user info field may be used to assign RU combination(s) to a STA.

Figure 5:
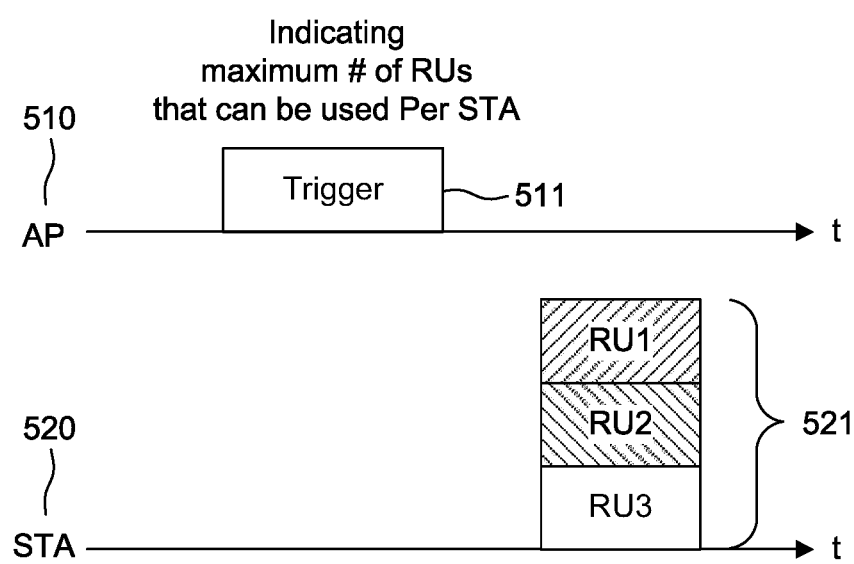
FIG. 5 is a system diagram illustrating an example of a random access method, in which a maximum number of resource units (RUs) that may be used per STA is indicated.

An OFDMA-based multi-RU UL random access procedure may be used by STAs and APs. For single RU transmission, a trigger frame may be used for trigger-based OFDMA UL random access. If multi-RU transmission is allowed, the procedure may be changed as shown in FIG. 5, which is described more substantially in paragraphs below.

An AP may transmit a trigger frame, which may indicate one or more information elements including a trigger type, user info field, maximum number of RUs per user, or the like. A trigger type in a Common Info field may indicate a multi-RU trigger.

In a User Info field, if an AID12 subfield indicates an allocation for UL random access, the Reserved subfield and/or Trigger Dependent User Info subfield in User Info field may indicate the assigned RU may be allowed as part of multi-RU UL transmission. In some methods, an existing subfield may be used to indicate this information. For example, an unused value in an UL MCS subfield in a User Info field may be used to indicate if the RU may be allowed for multi-RU UL transmission.

A maximum number of RUs per user field may indicate the maximum number of RUs that may be selected for a user for performing UL random access. An AP may use this field to perform admission control. For example, if there are more users in the BSS than a threshold, the AP may indicate a smaller number of RUs per user; if there are less users in the BSS, e.g., the number of users is less than a threshold, the AP may indicate a larger number of RUs per user. This field may be included in a Common Info or User Info fields.

A STA that may send or forward UL traffic may attempt to use the assigned RUs for random access. The STA may have different criteria for selecting one or more RUs for random access. In this example, the STA may select two RUs for UL transmission. Exemplary random access methods are described below with reference to FIG. 5.

FIG. 5 is an illustration of an example procedure for trigger-based UL OFDMA random access. An UL multi-RU random access method considering RU combinations may include one or a combination of the following steps or procedures. For example, as is shown in FIG. 5, an AP 510 may initiate a trigger-based UL OFDMA random access procedure by transmitting a trigger frame 511 to a STA 520. The STA 520 may be configured with an UL OFDMA Backoff (OBO) counter $N_O$ randomly drawn between [0, OCW]. The STA may receive the trigger frame 511 that may include a field $N_{RUs}$ indicative of random access resource units (RA-RUs) 521. The STA 520 may be allowed to select one or more of the RA-RUs 521 for uplink transmission.

The STA 520 may check whether $N_O-N_{RUs}>0$. If so, the STA 520 may set $N_O=N_O-N_{RUs}$, hold its transmission, and wait for a later trigger frame. Otherwise, it may prepare to select one or more RA-RUs for UL transmission and follow the below steps.

The STA 520 may form a table with all the possible RU combinations based on information carried in trigger frame 511 and/or other management/control frames received previously. In some methods, not all the RU combinations may be possible for multi-RU transmissions, and the table may only contain possible combinations. The table may be formed using a standard method, e.g., one that is predefined or configured in accordance with standard specifications, so that all the STAs may form the table in the same way with the same order if they receive the same trigger frame. The STA 520 may randomly select one combination from the table to perform the transmission. For example, as is shown in FIG. 5, the STA may select RU1 and RU2 from the available RA-RUs 521.

The STA 521 may need to sense the channel before transmitting on the selected RUs. If a STA senses that one or more RUs in the selected RU combination may be busy, it may hold the transmission and wait for a next trigger frame. Alternatively, or additionally, a STA may truncate the PPDU and transmit on the available RUs.

The STA 521 may perform coding across all the RUs. Alternatively, or additionally, the STA may perform per-RU coding, which means the coded bits on each RU may be individually encoded and/or protected by a cyclic redundancy check (CRC); thus, RU-based acknowledgement and retransmission may be possible.

If no RU combination has sufficient subcarriers to cover the needed subcarriers $N_{SCS,needed}$, the STA may reduce the needed number of subcarriers using predefined or predetermined functions, e.g., $N_{SCS,needed}=F(N_{SCS,needed})$. The STA may prepare corresponding methods to fragment the frame. For example, the STA may uniformly fragment the frame by two by applying the function $F(x)=x/2$. The STA may repeat any such steps until the STA may find an RU or RU combination to transmit the frame or fragment of the frame.

An UL multi-RU random access method considering RU combination and traffic size may include one or more of the following procedures or steps. The STA may be configured with an OBO counter $N_O$ randomly drawn between [0, OCW]. The STA may receive a trigger frame that may include $N_{RUs}$ random access resource units (RA-RUs). The STA may be allowed to select one or more RA-RUs for uplink transmission.

The STA may check whether $N_O-N_{RUs}>0$. If so, the STA may set $N_O=N_O-N_{RUs}$, hold its transmission, and wait for a later Trigger frame. Otherwise, it may prepare to select one or more RA-RUs for UL transmission and follow steps or perform procedures as described in paragraphs below.

The STA may calculate the expected needed number of subcarriers per stream needed to carry the entire frame/A-MPDU to be transmitted, using the UL MCS and UL spatial stream assigned in the received trigger frame.

$$N_{SCS,needed} = \frac{8 \text{APEP\_length} + N_{service} + N_{tail} + N_{add}}{N_{ss} N_{IBPSCS}} \quad \text{Equation 1}$$

Here, APEP_length may be the PSDU length in bytes. $N_{service}$ may be the number of bits in a service field. $N_{tail}$ may be the number of tail bits if needed. $N_{SS}$ may be the number of spatial streams assigned for the user. $N_{IBPSCS}$ may be the number of information bits per subcarrier per spatial stream with a given MCS assigned to the user. $N_{add}$ may refer to additional PHY/Mac padding in addition to APEP- _length, if needed. For example, PHY layer padding may be needed to enable per-RU coding and error detection if per RU coding is utilized.

If one or more RUs or RU combinations have enough subcarriers to cover the needed subcarriers $N_{SCS,needed}$, the STA may generate a valid RU or RU combination table, which may include the valid combinations. The STA may randomly select one RU or RU combination from the table to transmit the frame or A-MPDU.

The STA may need to sense the channel before transmitting on the selected RUs. If the STA senses that one or more RUs in the selected RU combination may be busy, it may hold the transmission and wait for next trigger frame. Alternatively, or additionally, it may truncate the PPDU and transmit on the available RUs.

The STA may perform coding across all the RUs. Alternatively, or additionally, the STA may perform per-RU coding, which means the coded bits on each RU may be individually encoded and/or protected by a CRC; thus, RU-based acknowledgement and retransmission may be possible.

After the UL trigger-based transmission, the STA may expect an acknowledgement. In the case that an acknowledgement unit and retransmission unit are not RU-based, the STA may set $OCW=OCW_{min}$ if the STA receives positive acknowledgement; otherwise the STA may set $CW=\min(2\times OCW+1, OCW_{max})$.

In the case that acknowledgement unit and retransmission units are RU-based, the STA may update the OCW according to one or more of the following procedures or steps. In some methods, the STA may set the $OCW=OCW_{min}$ if the acknowledgements received by the STA are all positive; otherwise the STA may set $OCW=\min(2\times OCW+1, OCW_{max})$. In some methods, the STA may set the $OCW=OCW_{min}$ if the STA receives at least one positive acknowledgement; otherwise the STA may set $OCW=\min(2\times OCW+1, OCW_{max})$.

Multi-RU UL transmissions may be schedule-based. A trigger frame may assign multiple RUs or RU combination to a STA for UL transmission. Under certain conditions, for example, a carrier sense (CS) required subfield in the trigger frame may be set, i.e., the STA may need to perform carrier sensing before it responds with a TB PPDU. With multiple RUs, it may be possible that some RUs or partial RUs are available for UL transmission, but not all of the multiple RUs are available. A trigger-based transmission rule may be set in such cases, which may be referred to as partial response. A STA acting based on the partial response rule may perform a transmission on all the available RUs, perform a transmission on a subset of available RUs, or hold the transmission and wait for a later opportunity.

Conditions upon which a STA may transmit on a subset of RUs assigned by the AP, or conditions for partially responding with an HE TB PPDU may depend on physical and/or virtual carrier sensing results.

In some methods, a partial response may include PHY layer signaling so that the receiver (e.g., the AP) may know the UL transmission may be performed differently from how it was assigned in the trigger frame. The PHY layer signaling may include a STA identity and information that may be modified by the STA, such as MCS, spatial streams and RU allocation. RU allocation information may indicate the RUs used for the UL transmission. In some methods, the RU allocation may include the user information field indices indicated in the trigger frame. For example, in the trigger frame, the $k1^{st}$, $k2^{nd}$, and $k3^{rd}$ User Info field may carry RU allocation information for the STA. The STA may be able to transmit on RUs allocated by the $k1^{st}$ and $k2^{nd}$ User Info fields, and the STA may use k1 and k2 to indicate the RUs used in the PHY layer signaling. In some methods, the STA may use the RU allocation field defined in the User Info fields in the trigger frame.

The PHY layer signaling may be transmitted on the RUs that carry the data field of the STA. Such RUs may also be referred to as data RUs. The signaling field or fields may be located after the narrow band STF/LTF transmitted on the data RUs, but before the data field. The signaling field or fields may be independently coded and protected with its own CRC. The signaling may be modulated to one RU and duplicated on the rest of the RUs. Each signaling field or fields may carry RU allocation for all the data RUs.

In some embodiments, the wireless medium may be reserved for Multi-AP and Multi-link operations. A number of medium reservation designs may be used to conduct medium reservation for multi-AP operations as follows.

Figure 6:
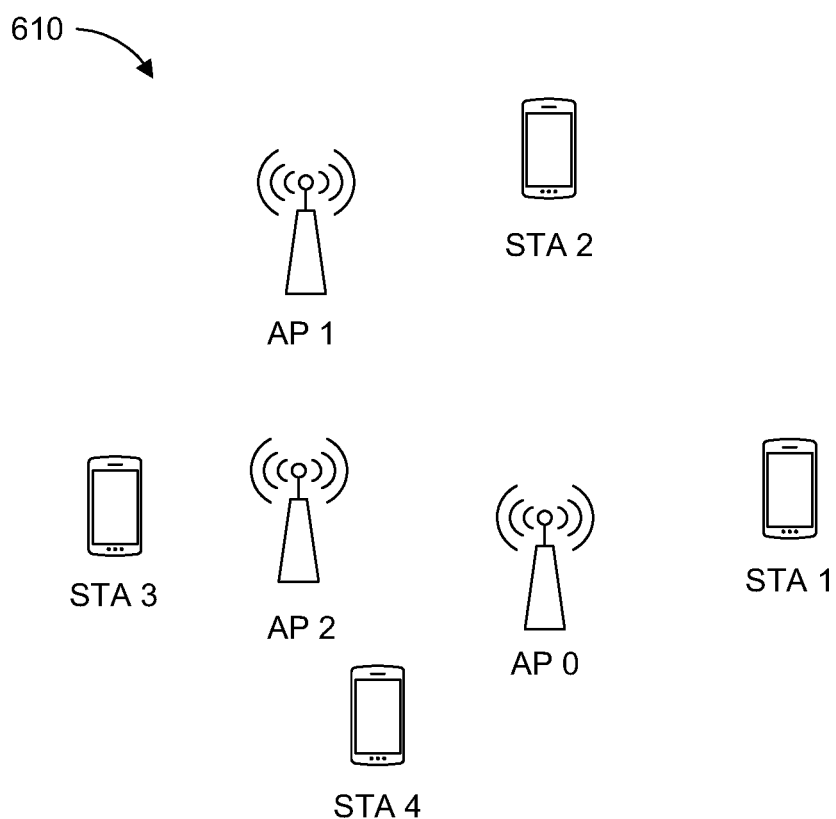
FIG. 6 is a drawing illustrating an example of a multi-AP network in which three APs collaborate together to conduct multi-AP operations across three different basic service sets (BSSs)

FIG. 6 is an illustration of an example network of a multi-AP set. In the example multi-AP network 610 of FIG. 6, three APs, AP 0, AP 1, and AP 2, may collaborate together to conduct multi-AP operations across three different BSSs. A plurality of STAs, STA 1, STA 2, STA 3, and STA 4, may also be configured to operate within the multi-AP network. Multi-AP operations may include coordinated OFDMA, coordinated beamforming, joint transmissions, and other operation types. Each of the three different BSSs may be started by a respective AP namely AP 0, AP 1, or AP 2. STA 1 may be associated with AP 0; STA 2 may be associated with AP 1; and STA 3 and STA 4 may be associated with AP 2. Without loss of generality, AP 0 may be assumed to be the coordinating AP or sharing AP of the multi-AP set. AP 0 may be a previously assigned coordinating AP or may be selected as coordinating AP for the multi-AP set. AP 0 may also be an sharing AP that has just acquired a transmit opportunity (TXOP) and is willing to share with other APs.

Figure 7:
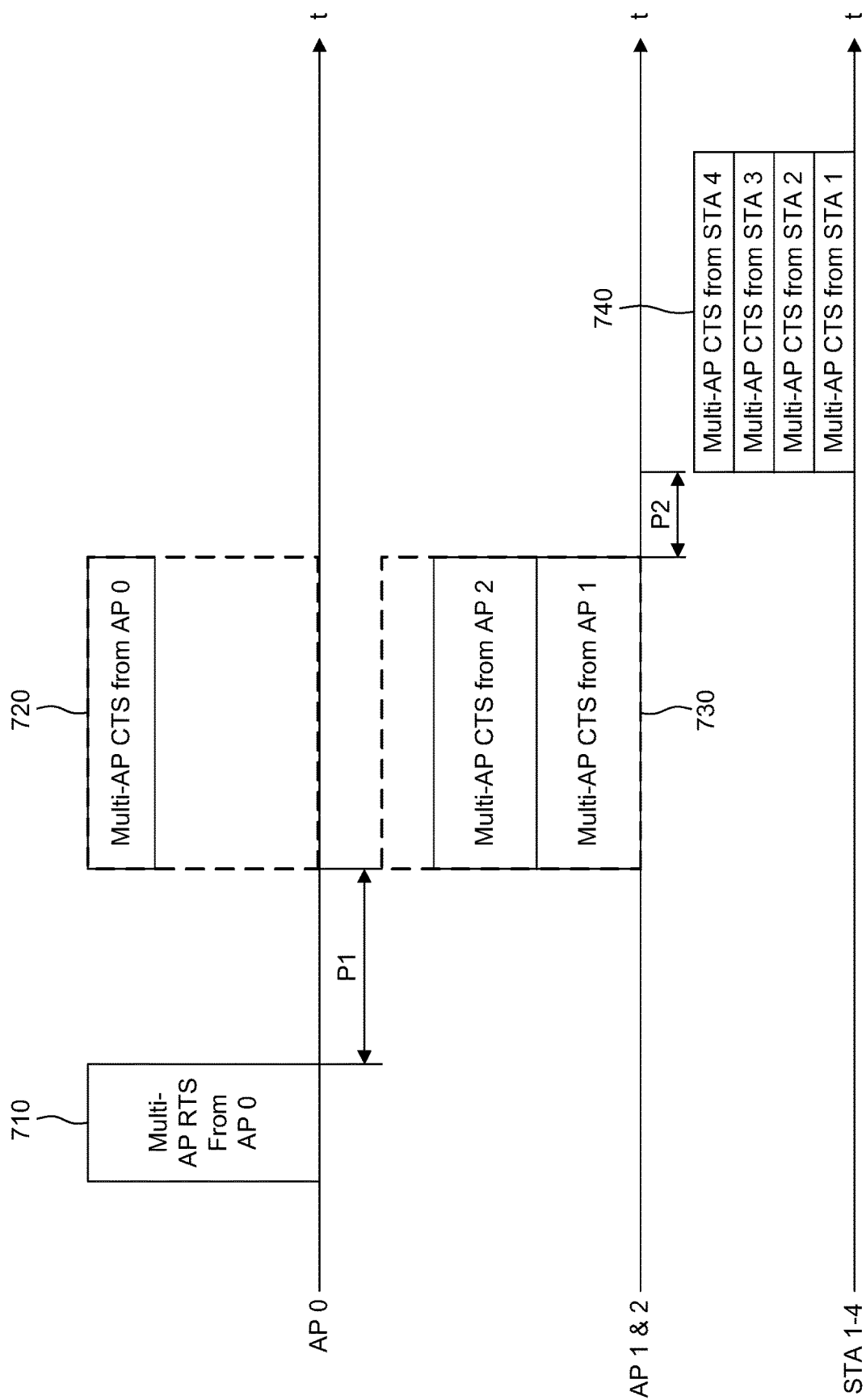
FIG. 7 is a drawing illustrating an example design of a procedure for medium reservation for a multi-AP operation protocol.

FIG. 7 is an illustration of an example design of medium reservation for multi-AP operation. The multi-AP system depicted in FIG. 7 may include three different APs associated with three different BSSs and four different STAs, similar to the system depicted in FIG. 6 and described substantially above. AP 0 may be the coordinating AP. The coordinating or sharing AP 0 may send a Multi-AP Request-To-Send (RTS) frame 710 to the one or more shared APs or coordinated APs, for example, AP 1 and AP 2. The Multi-AP RTS frame 710 may also be received by one or more STAs operating in associated BSSs, e.g., STAs 1-4.

The Multi-AP RTS frame 710 may be implemented as a modified version of a MU-RTS frame or trigger frame. For example, a new value in the trigger type subfield may be used to indicate that the MU-RTS or trigger frame may be a Multi-AP RTS frame. Alternatively, or additionally, a bit in the MU-RTS frame may be set to indicate that it is a Multi-AP RTS frame. In some cases, a new frame format may be designed for Multi-AP RTS frames.

The Multi-AP RTS frame 710 may contain one or more AP addresses or AP identifiers such as Multi-AP APIDs. The Multi-AP RTS frame may also contain frequency channel or RU allocations for the APs in the multi-AP set. The Multi-AP RTS frame may also contain information for the transmitting AP, e.g., AP 0. The information may be used by other APs in the multi-AP set to be informed of the transmitting AP's frequency allocations. The APs identified by the Multi-AP frame may use the allocated frequency channels or RUs to transmit response frames such as Multi-AP Clear-To-Send (CTS) frames 720 and 730. The APs identified by the Multi-AP frame may consider the allocated frequency channel or RUs assigned to them to be used in the subsequent multi-AP communications, e.g., to be used in the coordinated OFDMA, coordinated beamforming, or shared transmit opportunity (TXOP). In addition, the Multi-AP RTS frame may include a timing schedule to be used for each of the APs identified in the Multi-AP RTS frame.

An AP (e.g., AP 0, AP 1, and/or AP 2) that is identified in the Multi-AP RTS frame may respond with a Multi-AP CTS frame, denoted by element 730. For example, AP 1 and/or AP 2 may each transmit a Multi-AP CTS frame 730 after receiving the Multi-AP RTS frame 710. AP 1 and/or AP 2 may wait for the duration of period P1, which may be an SIFS period, for example, after receiving a Multi-AP RTS frame, before transmitting a Multi-AP CTS 730. Such a Multi-AP CTS frame may be transmitted on the allocated frequency channel or RUs as indicated in the received Multi-AP RTS frame 710. An AP that is identified in the Multi-AP RTS frame may only respond on those allocated frequency channels or RUs on which the medium is free. The responding APs may use the response to reserve the medium for their own respective BSSs. The reserved medium may be a portion of the bandwidth used by the AP 0 for transmission of the Multi-AP RTS frame 710. If a time schedule is included in the Multi-AP RTS frame 710, the responsive Multi-AP CTS frame 720 or 730 may be transmitted according to the time schedule.

The sharing AP or coordinating AP, such as AP 0, may transmit the Multi-AP CTS frame 720 at the same time the other responding APs in the multi-AP set to preserve the medium reservation for its own BSS. The reserved medium may be a portion of the bandwidth used by the AP 0 for transmission of the Multi-AP RTS frame 710. For example, AP 0 may wait for the duration of period P1, which may be an SIFS period, for example, after transmitting the Multi-AP RTS frame 710.

The Multi-AP CTS frames 720 and 730 may be modified versions of the CTS frame or a newly designed frame. The Multi-AP CTS frames 720 and 730 may be modified versions of the MU-RTS frame or trigger frame. A new value in the trigger type subfield may be used to indicate that the MU-RTS or trigger frame may be a Multi-AP CTS frame. Alternatively, or additionally, a bit in the MU-RTS frame may be set to indicate that it is a Multi-AP CTS frame. In another example, a new frame format may be designed for Multi-AP CTS frames. Multi-AP CTS frames sent by an AP may contain one or more fields for one or more associated STAs or unassociated STAs.

The Multi-AP CTS frames 720 and/or 730 may contain one or more STA addresses, or STA identifiers such as Multi-AP AIDs or AIDs. The Multi-AP CTS frames 720 and/or 730 may also contain frequency channel or RU allocations for the STAs associated with the transmitting AP. The STAs identified by the Multi-AP frame may use the allocated frequency channels or RUs to transmit response frames such as Multi-AP CTS frames, or simply CTS frames.

STAs that receive the Multi-AP RTS frame 710 may monitor for MU-CTS frames from associated APs following the period P1. A period P2, which may be an SIFS period for example after receiving a Multi-AP CTS frame, a STA that is identified in one of the Multi-AP CTS frames 720 or 730 may respond with a Multi-AP CTS frame as shown in FIG. 7 or simply a CTS frame. Such a Multi-AP CTS may be transmitted on the allocated frequency channel or RUs as indicated in the received Multi-AP CTS frame. A STA that is identified in the Multi-AP CTS frame may only respond on those allocated frequency channels or RUs on which the medium is free. If a time schedule is included in the Multi-AP CTS frame, the responding Multi-AP CTS or CTS frame may be transmitted according to the time schedule.

Figure 8:
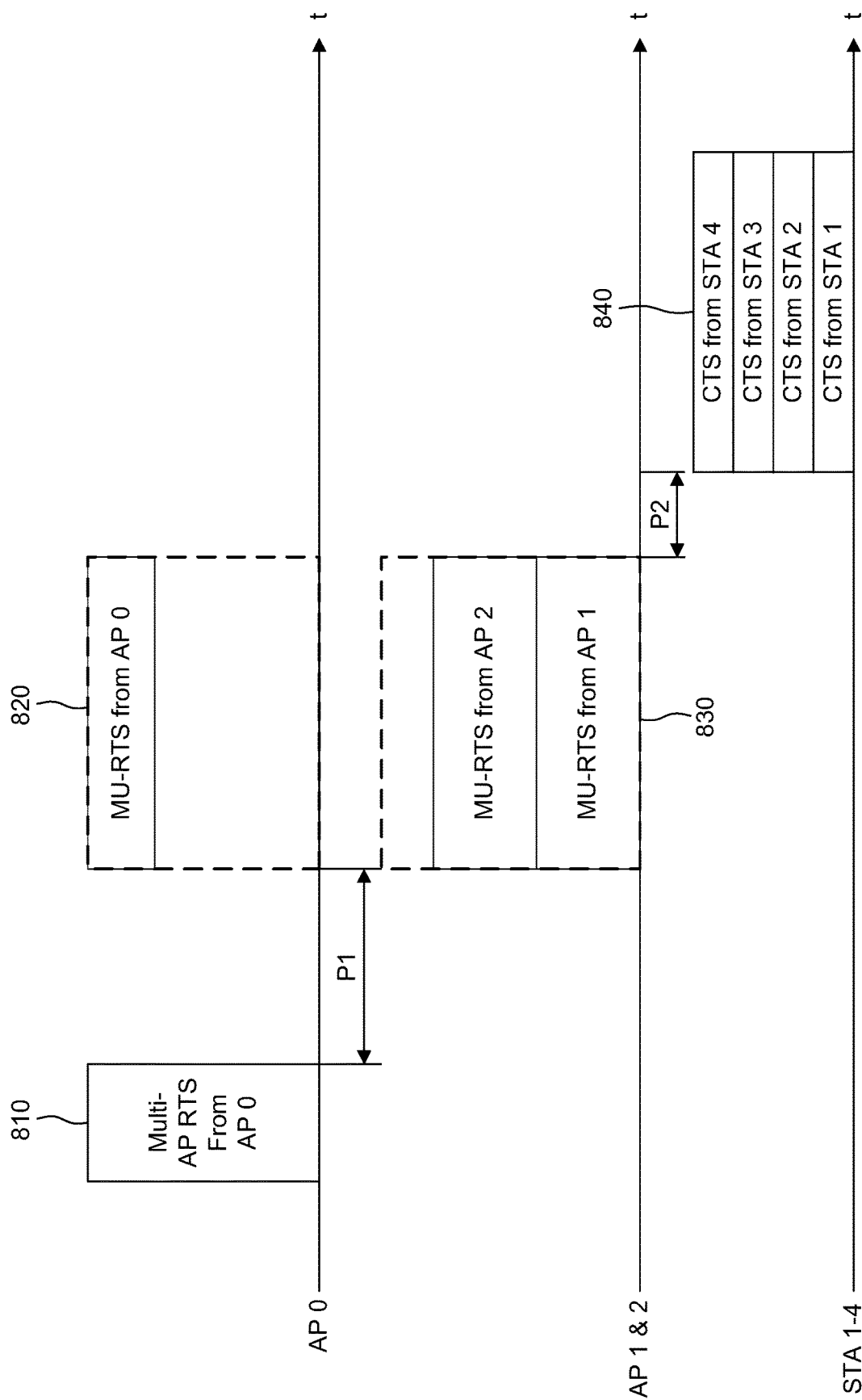
FIG. 8 is another drawing illustrating an example design of a procedure for medium reservation for a multi-AP operation protocol.

Other methods may also make use of a medium reservation protocol may be used, as illustrated in FIG. 8. In such methods, similar to the scenario described above with respect to FIG. 7, a coordinating or sharing AP may send a Multi-AP RTS frame to one or more shared APs or coordinated APs, e.g., AP 1 and AP 2.

FIG. 8 is an example of another design for medium reservation for multi-AP operation. The Multi-AP RTS frame 810 may contain one or more AP addresses or AP identifiers such as Multi-AP APIDs. The Multi-AP RTS frame 810 may also contain frequency channel or RU allocations for the APs in the multi-AP set. The Multi-AP RTS frame 810 may also contain information for the transmitting AP, e.g., AP 0. The information may be used by other APs in the multi-AP set to be informed of the transmitting AP's frequency allocations. The APs identified by the Multi-AP RTS frame 810 may use the allocated frequency channels or RUs to transmit response frames such as Multi-AP CTS frames, and/or MU-RTS frames, denoted in FIG. 8 by element 830. The APs identified by the Multi-AP frame may consider the allocated frequency channel or RUs assigned to them to be used in the subsequent multi-AP communications, e.g., to be used in the coordinated OFDMA, coordinated beamforming, or shared TXOP. In addition, the Multi-AP RTS frame may include timing schedule to be used for each of the APs identified in the Multi-AP RTS frame. The Multi-AP RTS frame 810 may also be received by one or more STAs operating in associated BSSs, e.g., STAs 1-4.

An AP that is identified in the Multi-AP RTS frame may respond with a MU-RTS frame. AP 1 and/or AP 2 may wait for the duration of period P1, which may be an SIFS period for example, after receiving the Multi-AP RTS frame 810, before transmitting an MU-RTS frame 830. The MU-RTS frame 830 may be transmitted on the allocated frequency channel or RUs as indicated in the received Multi-AP RTS frame. An AP that is identified in the Multi-AP RTS frame may only respond on those allocated frequency channels or RUs on which the medium is free. The responding APs may use the response to reserve the medium for their own respective BSSs. The reserved medium may be a portion of the bandwidth used by the AP 0 for transmission of the Multi-AP RTS frame 810. If a time schedule is included in the Multi-AP RTS frame 810, the responding MU-RTS 830 may be transmitted according to the time schedule.

The sharing AP or coordinating AP, such as AP 0, may transmit a MU-RTS frame 820 at the same time the other responding APs in the multi-AP set send respective MU-RTS frames 830. The MU-RTS frame 820 may be used by the sharing or coordinating AP 0 to conduct medium reservation for its own BSS. STAs that receive the Multi-AP RTS frame 810 may monitor for MU-RTS frames from associated APs following the period P1. A STA that is identified in a MU-RTS frame may respond with a CTS frame following the MU-RTS/CTS protocol. For example, one or more of STAs 1-4 may wait for the duration of period P2, which may be an SIFS period, after receiving one or more of the MU-RTS frames 820 or 830, before transmitting a CTS frame 840. Such a CTS may be transmitted on the allocated frequency channel or RUs as indicated in the received MU-RTS frame.

Figure 9:
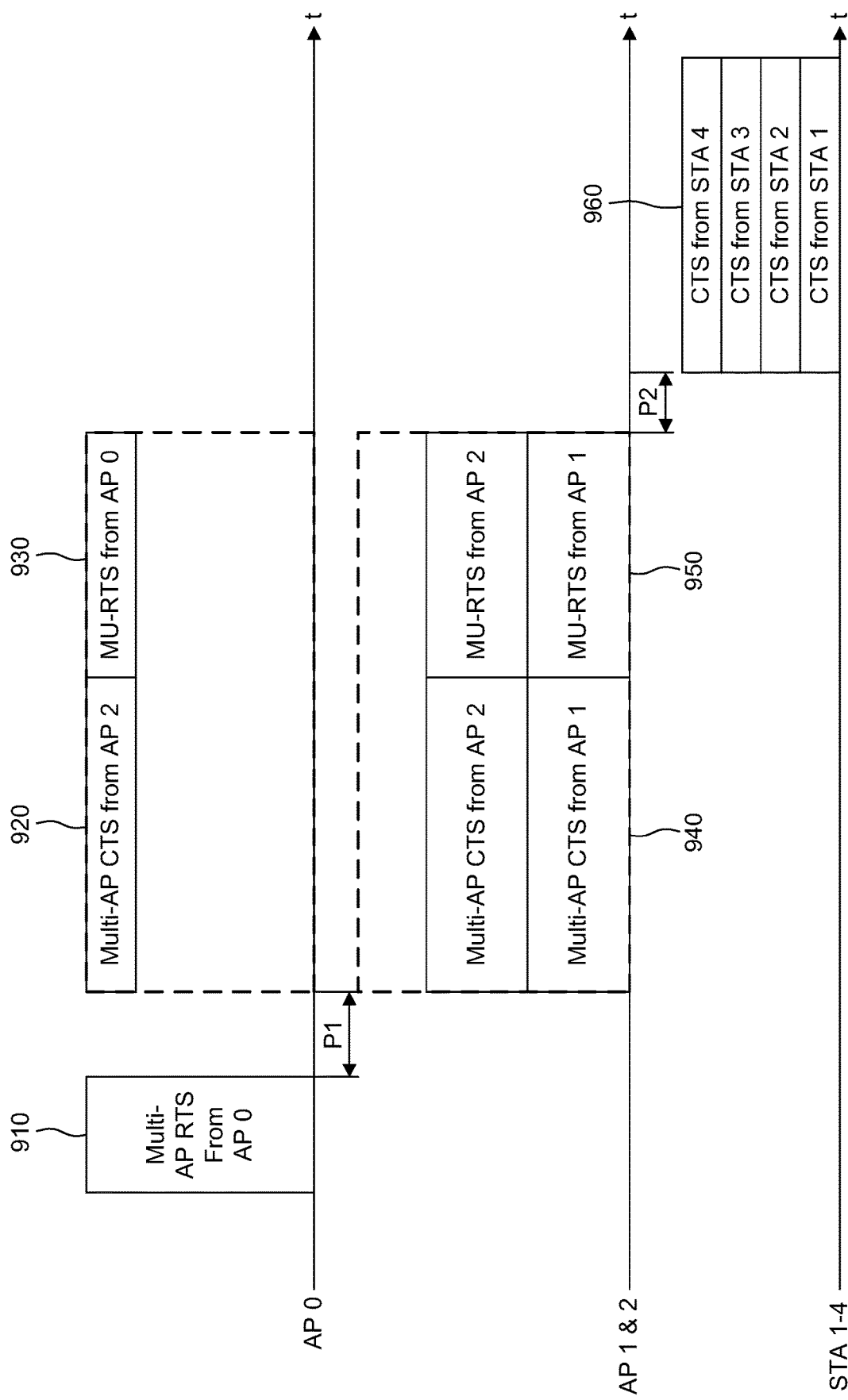
FIG. 9 is another drawing illustrating an example of a procedure for medium reservation for a multi-AP operation protocol.

FIG. 9 is an illustration of another example medium reservation design for multi-AP operations. As shown in FIG. 9, a coordinating or sharing AP 0 may send a Multi-AP RTS frame 910 to one or more shared APs or coordinated APs, e.g., AP 1 and AP 2. The Multi-AP RTS frame 910 may also be received by one or more STAs operating in associated BSSs, e.g., STAs 1-4.

The Multi-AP RTS frame 910 may contain one or more AP addresses, or AP identifiers such as Multi-AP APIDs. The Multi-AP RTS frame 910 may also contain frequency channel or RU allocations for the APs in the multi-AP set. The Multi-AP RTS frame 910 may also contain information for the transmitting AP, such as AP 0. The information may be used by other APs in the multi-AP set to be informed of the transmitting AP's frequency allocations. The APs identified by the Multi-AP frame 910 may use the allocated frequency channels or RUs to transmit response frames such as Multi-AP CTS frames, denoted in FIG. 9 by element 940. The APs identified by the Multi-AP frame may consider the allocated frequency channel or RUs assigned to them to be used in the subsequent multi-AP communications, e.g., to be used in the coordinated OFDMA, coordinated beamforming, or shared TXOP. In addition, the Multi-AP RTS frame 910 may include timing schedule to be used for each of the APs identified in the Multi-AP RTS frame.

An AP that is identified in the Multi-AP RTS frame may respond with an aggregated frame, which may contain a Multi-AP CTS frame 940 as well as a MU-RTS frame 950. AP 1 and/or AP 2 may wait for the duration of period P1, which may be an SIFS period for example, after receiving the Multi-AP RTS frame 910, before transmitting aggregated frames. Such aggregated frames may be transmitted on the allocated frequency channels or RUs as indicated in the received Multi-AP RTS frames. An AP that is identified in the Multi-AP RTS frame may only respond on those allocated frequency channels or RUs on which the medium is free. If a time schedule is included in the Multi-AP RTS frame 910, the responding aggregated frame may be transmitted according to the time schedule.

The sharing AP or coordinating AP, such as AP 0, may transmit an aggregated packet containing Multi-AP CTS frame 920 and a MU-RTS frame 930 at the same time the other responding APs in the multi-AP set send respective Multi-AP CTS and MU RTS frames 940 and 950. The Multi-AP CTS frame 920 and a MU-RTS frame 930 may be used by the sharing or coordinating AP 0 to preserve the medium reservation for its own BSS. AP 0 may wait for the duration of period P1, which may be an SIFS period for example, after sending the Multi-AP RTS frame 910, before transmitting the aggregated frame including the Multi-AP CTS frame 920 and the MU-RTS frame 930.

The Multi-AP CTS frame may be a modified version of the CTS frame or a newly designed frame.

In some designs, an AP that is identified in the Multi-AP RTS frame may respond with a Multi-AP CTS frame after a period (e.g., an SIFS) after receiving a Multi-AP RTS frame. After another time period, e.g., an SIFS, the AP may transmit a MU-RTS frame to conduct medium reservation for its own BSS. Both frames may be transmitted on the allocated frequency channel or RUs as indicated in the received Multi-AP RTS frame. An AP that is identified in the Multi-AP RTS frame may only respond on those allocated frequency channels or RUs on which the medium is free. If a time schedule is included in the Multi-AP RTS frame, the responding frames may be transmitted according to the time schedule.

The sharing AP or coordinating AP, such as AP 0, may transmit a Multi-AP CTS frame. After another SIFS time period, the AP 0 may transmit a MU-RTS frame at the same time as the other responding APs in the multi-AP set. The AP 0 may do this to preserve the medium reservation for its own BSS.

Further with respect to FIG. 9, considering operation of STAs 1-4, which may also have received the initial Multi-AP RTS frame 910 from AP 0, one or more of the STAs 1-4 may wait for a first period P1 before monitoring for responding frames from one or more of the identified APs. For example, consistent with the procedure shown in FIG. 9, a STA that is configured to operate in a BSS associated with AP 0 may receive the Multi-AP RTS frame 910. The STA may wait for the first period P1 before receiving, e.g., one or both of the Multi-AP CTS frame 920 and MU-RTS frame 930.

A Multi-AP CTS transmitted by an AP may be intended to acknowledge the Multi-AP RTS frame and preserve the medium reservation for the associated BSS. A period (e.g., an SIFS) after receiving one or more of the MU-RTS frame, a STA that is identified in one or more of the MU-RTS frames may respond with a CTS frame following the MU-RTS/CTS protocol. Such a CTS may be transmitted on the allocated frequency channel or RUs as indicated in one or more of the received MU-RTS frame. For example, a STA that is identified in MU-RTS frame 930 and associated with AP 0 may wait for the duration of period P2 before transmitting a CTS frame 960. The CTS frame may be transmitted on an allocated channel frequency or RUs as indicated in MU-RTS frame 930.

Similar procedures may be performed by other STAs associated with AP 1 or AP 2. For example, a STA may wait for the first period P1 after transmission of the Multi-AP RTS frame 910 by AP 0 before receiving one or both of the Multi-AP CTS frame 940 and MU-RTS frame 950 preserving the medium for the associated BSS. STAs that are identified in MU-RTS frame 950 and associated with AP 1 or AP 2 may wait for the duration of period P2 before transmitting one or more of CTS frames 960. The CTS frame or frames may be transmitted on allocated channel frequencies or RUs as indicated in one of the received MU-RTS frames 950.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. An access point (AP) for use in a multi-AP wireless local area network (WLAN), the AP comprising:
   a transmitter configured to transmit, using a set of resource units (RUs), a multi-AP ready-to-send (RTS) frame to at least one other AP and a plurality of stations (STAs);

the transmitter configured to transmit an aggregated frame using a portion of the set of RUs, wherein the aggregated frame comprises a multi-AP clear-to-send (CTS) frame and a multi-user (MU) RTS frame;

a receiver configured to receive, using the portion of the set of RUs, a clear-to-send (CTS) frame from at least one STA of the plurality of STAs, wherein the CTS frame is responsive to the aggregated frame; and the transmitter configured to transmit, using the portion of the set of RUs, a data frame to the at least one STA.

2. The AP of claim 1, wherein the multi-AP RTS frame includes resource allocation information for the at least one other AP and the plurality of STAs.

3. The AP of claim 1, wherein the portion of the set of RUs used to transmit or receive the aggregated frame, the CTS frame, and the data frame is a reserved medium associated with a basic service set (BSS).

4. The AP of claim 3, wherein the AP and the at least one STA are configured to operate in the BSS.

5. The AP of claim 1, wherein the aggregated frame includes a multi-AP CTS frame.

6. The AP of claim 5, wherein the MU RTS frame transmitted after the multi-AP CTS frame.

7. The AP of claim 1, wherein the CTS frame received from the at least one STA includes a field indicating that the CTS frame is a multi-AP CTS frame.

8. A method, performed by an access point (AP), for operating in a multi-AP wireless local area network (WLAN), the method comprising:

transmitting, using a set of resource units (RUs), a multi-AP ready-to-send (RTS) frame to at least one other AP and a plurality of stations (STAs);

transmitting an aggregated frame using a portion of the set of RUs, wherein the aggregated frame comprises a multi-AP clear-to-send (CTS) frame and a multi-user (MU) RTS frame;

receiving, using the portion of the set of RUs, a clear-to-send (CTS) frame from at least one STA of the plurality of STAs, wherein the CTS frame is responsive to the aggregated frame; and transmitting, using the portion of the set of RUs, a data frame to the at least one STA.

9. The method of claim 8, wherein the multi-AP RTS frame includes resource allocation information for the at least one other AP and the plurality of STAs.

10. The method of claim 8, wherein the portion of the set of RUs used to transmit or receive the aggregated frame, the CTS frame, and the data frame is a reserved medium associated with a basic service set (BSS).

11. The method of claim 10, wherein the AP and the at least one STA are configured to operate in the BSS.

12. The method of claim 8, wherein the aggregated frame includes a multi-AP CTS frame.

13. The method of claim 8, wherein the aggregated frame further includes a multi-user (MU) RTS frame transmitted after the multi-AP CTS frame.

14. The method of claim 8, wherein the CTS frame received from the at least one STA includes a field indicating that the CTS frame is a multi-AP CTS frame.

15. A station (STA) for use in a multi-access point (AP) wireless local area network (WLAN), the STA comprising:

a receiver configured to receive a multi-AP ready-to-send (RTS) frame, wherein the multi-AP RTS frame includes allocation information indicating a set of resource units (RUs);

the receiver configured to receive an aggregated frame using a portion of the set of RUs, wherein the aggregated frame is received after a first time period, wherein the aggregated frame comprises a multi-AP clear-to-send (CTS) frame and a multi-user (MU) RTS frame;

a transmitter configured to transmit, in response to the aggregated frame, CTS frame using the portion of the set of RUs, wherein the CTS frame is transmitted after a second time period; and the receiver configured to receive, in response to the transmitted CTS frame, a data frame using the portion of the set of RUs.

16. The STA of claim 15, wherein the multi-AP RTS frame includes resource allocation information.

17. The STA of claim 15, wherein the CTS frame includes a field indicating that the CTS frame is a multi-AP CTS frame.

* * * * *